(12) United States Patent
McMullen et al.

(10) Patent No.: US 8,849,306 B1
(45) Date of Patent: Sep. 30, 2014

(54) MANAGEMENT OF BASE STATION CONNECTIVITY IN LOCATION BASED SERVICE REQUESTS

(71) Applicant: Sprint Spectrum L.P., Overland Park, KS (US)

(72) Inventors: Michael P. McMullen, Leawood, KS (US); Alan J. Falk, Olathe, KS (US); Darrin C. Mott, Gardner, KS (US); Julie A. Hart, Raymore, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 54 days.

(21) Appl. No.: 13/754,392

(22) Filed: Jan. 30, 2013

(51) Int. Cl.
*H04W 24/00* (2009.01)
*G01S 19/03* (2010.01)
*G01S 19/27* (2010.01)
*H04W 4/02* (2009.01)

(52) U.S. Cl.
CPC ..................................... *H04W 4/02* (2013.01)
USPC ..................... 455/456.1; 455/456.2; 455/457; 455/456.6; 342/357.4; 342/357.66

(58) Field of Classification Search
CPC ........ H04W 4/02; H04W 64/00; G01S 19/27; G01S 19/258; G01S 19/05
USPC ........................ 455/456.2, 456.1, 457, 456.6; 342/357.4, 357.66
See application file for complete search history.

(56) References Cited

U.S. PATENT DOCUMENTS

| | | | |
|---|---|---|---|
| 2003/0096620 A1* | 5/2003 | Ozturk et al. ................. | 455/456 |
| 2003/0125046 A1* | 7/2003 | Riley et al. ................... | 455/456 |
| 2010/0093377 A1* | 4/2010 | Riley et al. ................. | 455/456.6 |
| 2011/0057836 A1* | 3/2011 | Ische et al. ................ | 342/357.43 |
| 2013/0203438 A1* | 8/2013 | Shin ........................... | 455/456.1 |
| 2013/0231114 A1* | 9/2013 | Jayanthi et al. ............... | 455/436 |

* cited by examiner

*Primary Examiner* — Opiribo Georgewill

(57) ABSTRACT

Disclosed herein are methods and systems to help provide a location of a mobile station in cases in which the location of the serving base station may not be known or may not be available from a base station almanac. According to the disclosed methods and systems, if the serving base station is not listed in the almanac, a positioning system will direct the mobile station to obtain identification information from a second base station (e.g., the "second best" available base station) by acquiring or partially acquiring a connection to the second base station. The positioning system may then query the almanac for location information of the second base station, based on the identification information obtained from that base station.

20 Claims, 5 Drawing Sheets

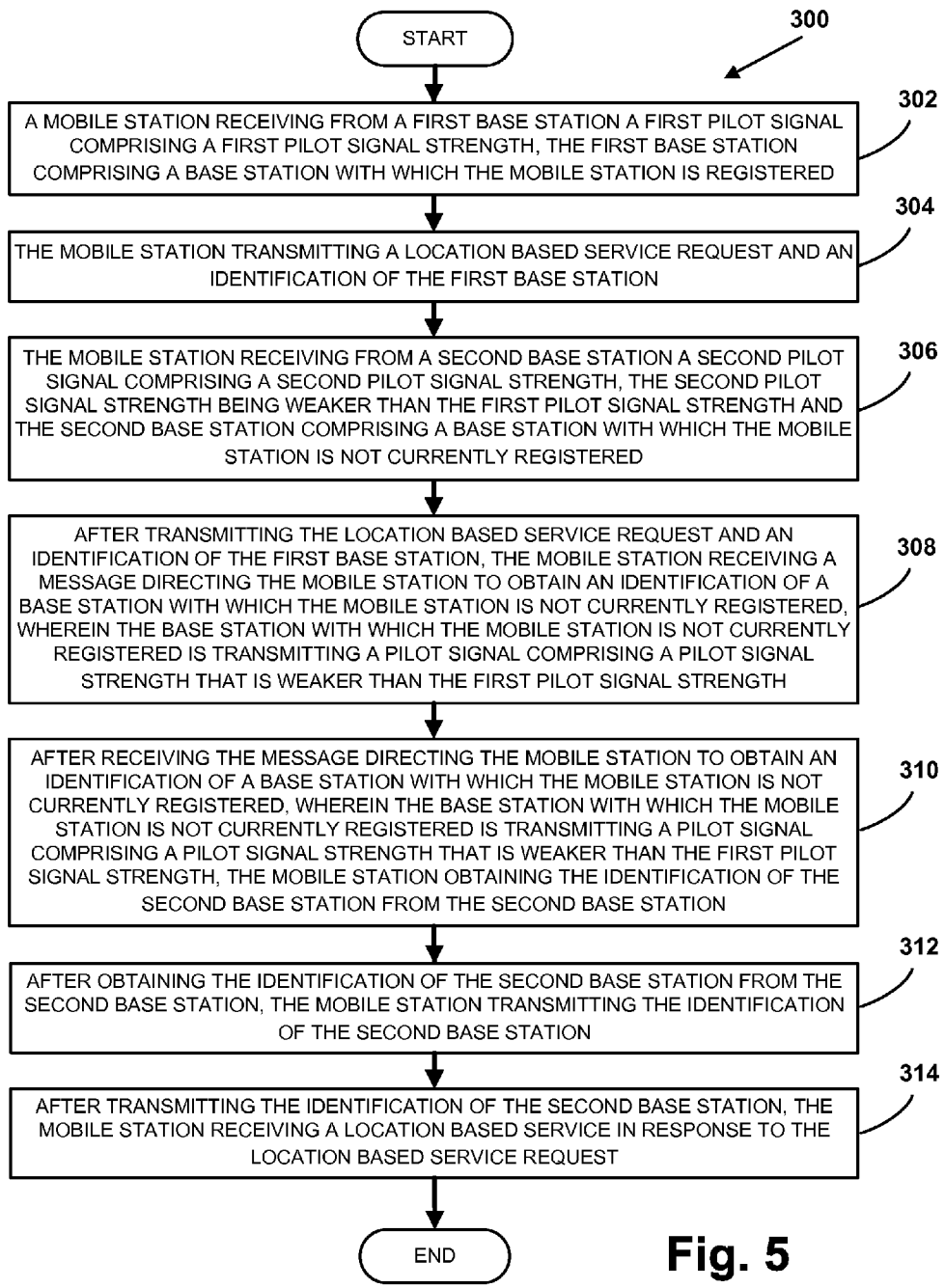

MANAGEMENT OF BASE STATION CONNECTIVITY IN LOCATION BASED SERVICE REQUESTS

BACKGROUND

An important feature of contemporary cellular wireless networks is an ability to locate the geographical position of a mobile station, such as, for example, a cell phone, tablet computer, tracking device, embedded wireless module, or other wirelessly equipped communication device. Such a feature was initially developed to assist emergency services in locating a mobile station. However, the availability of location information to support emergency services has given rise to the development of many other location based service (LBS) applications as well.

For example, given the location of a mobile station, a location based service provider (LBSP) (e.g., a wireless cellular carrier or third party) can provide the mobile station user with a weather or traffic report in the user's vicinity, a list of services or establishments in the user's vicinity, navigation instructions for travel from the user's location to another location, or other useful information. As another example, the LBSP can dispatch emergency assistance to the user at the user's location. And as still another example, the LBSP can report the mobile station's location to a requesting entity for various purposes, such as to facilitate tracking of the mobile station or of an associated person or object. Other LBS applications exist currently, and more will inevitably be developed in the future as well.

Typically, a wireless carrier will operate a positioning system that is arranged to determine and report mobile station locations to LBSP applications (such as 911 service centers or commercial location based information providers). The positioning system may include a mobile positioning center (MPC) and a position determining entity (PDE), which may be integrated together, or may take other forms. And the positioning system may function to determine the location of a given mobile station based on various factors and with varying degrees of granularity (i.e., precision).

In usual practice, when a mobile station seeks an LBS (such as an emergency aid dispatched to the mobile station's location, or download of content established or selected based on the mobile station's location), the mobile station may send a location based service request via a wireless packet data connection to the LBSP (or to another entity, which may send the request (or a derivative of the request) to the LBSP). In response to receipt of that request, the LBSP may then send a query to the mobile station's positioning system, seeking the location of the mobile station. In turn, the positioning system may then invoke a process to determine the mobile station's location and, upon determination of the mobile station's location, may report the location in a response to the LBSP. Based on the mobile station's location, the LBSP may then provide an LBS (such as delivering emergency aid to the mobile station's location, or delivering to the mobile station content established or selected based on the mobile station's location).

OVERVIEW

In some cases, when a positioning determining entity (PDE) seeks to determine the location of a mobile station, the mobile station provides to the PDE an identification of the mobile station's currently serving base station (e.g., the base station identifier (BSID) and system identity number (SID)/network identity number (NID)). The PDE then queries a base station almanac (BSA) to ensure that the currently serving base station is listed and to find the location of that base station. If the base station is listed, the PDE then requests the mobile station to provide a delay measurement for that base station and to report neighboring base stations and corresponding delay measurements. In reporting the requested information, the mobile station identifies neighboring base station with generalized information such as PN offset and frequency.

The PDE can then use this information to compute the mobile station's location. In particular, the PDE can look up the reported neighboring base stations in the BSA to determine their identities and locations. To do so, the PDE can search for base stations that neighbor the listed serving base station that have each indicated PN offset and frequency. Given the locations and delay measurements of the serving base station and each neighboring base station, the PDE can then determine the mobile station's location through a process such as multilateration.

If the serving base station is not listed in the BSA, however, this process will not work because the PDE will be unable to determine (i) the location of the serving base station and (ii) the locations of the neighboring base stations. The embodiments described herein can address this situation.

According to the disclosed embodiments, if the serving base station is not listed in the BSA, the PDE will direct the mobile station to drop its serving base station and connect with another base station (e.g., the "second best" available base station) to facilitate the location determination. Alternatively, the PDE may direct the mobile station to go through a partial acquisition process with another base station (e.g., the "second best" available base station) to determine sufficient identifying information (e.g., BSID and SID/NID), thereby facilitating the location determination without the need for the mobile station to drop its serving base station.

In one aspect, an example method may be carried out at a positioning system. The method may comprise: a positioning system receiving from a mobile station a request to determine a location of the mobile station and an identification of a first base station, the first base station comprising a base station with which the mobile station is registered, and the first base station broadcasting a first pilot signal comprising a first pilot signal strength; after receiving the request to determine the location of the mobile station, the positioning system querying an almanac to obtain a geographic location associated with the identification of the first base station; the positioning system determining that the almanac does not include the geographic location associated with the identification of the first base station; and after determining that the almanac does not include the geographic location associated with the identification of the first base station, the positioning system transmitting a message to the mobile station directing the mobile station to obtain an identification of a second base station, the second base station comprising a base station with which the mobile station is not currently registered, and the second base station broadcasting a second pilot signal comprising a second pilot signal strength, wherein the second pilot signal strength is weaker than the first pilot signal strength.

In another aspect, an example method may be carried out at a mobile station. The method may comprise: a mobile station receiving from a first base station a first pilot signal comprising a first pilot signal strength, the first base station comprising a base station with which the mobile station is registered; the mobile station transmitting a location based service request and an identification of the first base station; the mobile station receiving from a second base station a second pilot signal comprising a second pilot signal strength, the second pilot signal strength being weaker than the first pilot signal strength and the second base station comprising a base station with which the mobile station is not currently registered; after transmitting the location based service request and an identification of the first base station, the mobile station receiving a message directing the mobile station to obtain an identification of a base station with which the mobile station is not currently registered, wherein the base station with which the mobile station is not currently registered is transmitting a pilot signal comprising a pilot signal strength that is weaker than the first pilot signal strength; after receiving the message directing the mobile station to obtain an identification of a base station with which the mobile station is not currently registered, wherein the base station with which the mobile station is not currently registered is transmitting a pilot signal comprising a pilot signal strength that is weaker than the first pilot signal strength, the mobile station obtaining the identification of the second base station from the second base station; after obtaining the identification of the second base station from the second base station, the mobile station transmitting the identification of the second base station; and after transmitting the identification of the second base station, the mobile station receiving a location based service in response to the location based service request.

In yet another aspect, an example system may include a non-transitory machine readable medium having stored thereon instructions executable by a processing unit to carry out functions comprising: receiving from a mobile station a request to determine a location of the mobile station and an identification of a first base station, the first base station comprising a base station with which the mobile station is registered, and the first base station broadcasting a first pilot signal comprising a first pilot signal strength; after receiving the request to determine a location of the mobile station, querying an almanac to obtain a geographic location associated with the identification of the first base station, and determining that the almanac does not include the geographic location associated with the identification of the first base station; after determining that the almanac does not include the geographic location associated with the identification of the first base station, transmitting a message to the mobile station directing the mobile station to obtain an identification of a second base station, the second base station comprising a base station with which the mobile station is not currently registered, and the second base station broadcasting a second pilot signal comprising a second pilot signal strength, wherein the second pilot signal strength is weaker than the first pilot signal strength; after transmitting the message to the mobile station directing the mobile station to obtain the identification of the second base station, receiving the identification of the second base station; after receiving the identification of the second base station, querying the almanac to obtain a geographic location associated with the identification of the second base station, and determining that the almanac includes the geographic location associated with the identification of the second base station; and using the geographic location associated with the identification of the second base station to determine the location of the mobile station.

These as well as other aspects, advantages, and alternatives, will become apparent to those of ordinary skill in the art by reading the following detailed description, with reference where appropriate to the accompanying drawings

BRIEF DESCRIPTION OF THE DRAWINGS

FIG. 5 is a flow chart illustrating another method, according to an example embodiment.

DETAILED DESCRIPTION

Figure 1:
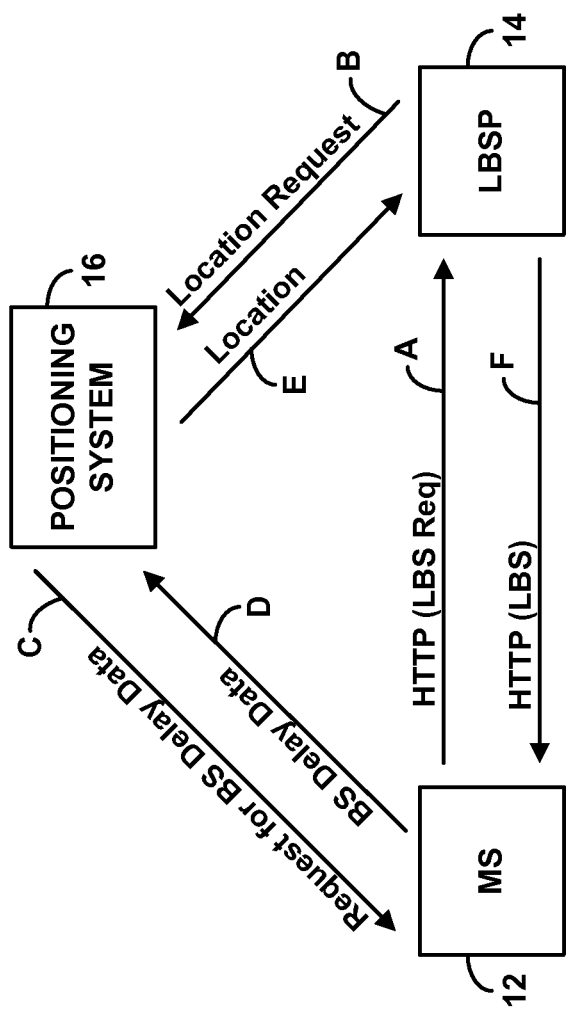
FIG. 1 is a simplified block diagram depicting a prior art arrangement and signaling used to request and receive a location based service.

Example methods and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. In the following detailed description, reference is made to the accompanying figures, which form a part thereof. In the figures, similar symbols typically identify similar components, unless context dictates otherwise. Other embodiments may be utilized, and other changes may be made, without departing from the spirit or scope of the subject matter presented herein.

A. Overview of an Example Wireless Communication System

In general, a mobile station, such as, for example, a cell phone, tablet computer, tracking device, embedded wireless module, or other wirelessly equipped communication device, communicates over an air interface with a base station (e.g., a cell tower). The base station provides the device with access to network resources, such as a communication channel to interact with other devices or with network servers.

In a typical cellular wireless communication system, multiple base stations are positioned throughout a market area, and each base station radiates to define a cell, including one or more cell sectors, in which mobile stations can operate. One or more base stations are then typically coupled or integrated with a base station controller, which manages air interface operation such as use of air interface channels and handoff of devices between sectors. In turn, one or more base station controllers may be coupled with a switch (e.g., mobile switching center) or gateway (e.g., packet data serving node) that provides connectivity with a transport network such as the public switched telephone network (PSTN) or the Internet. With this arrangement, a mobile station may communicate via a base station, base station controller, and the switch or gateway, with entities on the transport network.

In general, a cellular wireless system may be provided by a public land mobile network (PLMN) service provider and may operate in accordance with a particular air interface protocol or "radio access technology," with communications from the base stations to mobile stations defining a "forward link" (or downlink) and communications from mobile stations to the base stations defining a "reverse link" (or uplink). Examples of existing air interface protocols include CDMA (e.g., 1xRTT, 1xEV-DO), iDEN, TDMA, AMPS, GSM, GPRS, UMTS, EDGE, WiMAX (e.g., IEEE 802.16), LTE, microwave, satellite, MMDS, Wi-Fi (e.g., IEEE 802.11), Bluetooth, and infrared. Other protocols may also be employed. Each protocol may define its own procedures for initiation of calls, handoff between coverage areas, and functions related to air interface communication.

Further, air interface communications in each coverage area of a cellular wireless system may be encoded or carried in a manner that distinguishes the communications in that coverage area from communications in adjacent coverage areas. For example, in a CDMA system, each coverage area has a respective pseudo-random noise offset or "PN offset" that is used to encode or modulate air interface communications in the coverage area distinctly from those in adjacent coverage areas. And in an LTE system, each coverage area has a respective identifier ("cell ID" or "sector ID") that is broadcast in a synchronization signal to distinguish the coverage area from adjacent coverage areas. Analogously, in other air interface protocols, communications in one sector may be distinguished from those in other sectors by frequency, time, and/or various other parameters.

To enable a mobile station to select an appropriate coverage area in which to operate, the base stations in a cellular wireless system may be arranged to broadcast in each of their coverage areas a respective pilot signal (or "reference signal"). Further, the cellular wireless system may have a particular network identifier, such as a PLMN ID or a carrier frequency on which the system operates, and the base stations in the system may broadcast their pilot signals using that identifier or may separately broadcast an indication of the network identifier (e.g., in an overhead message such as an LTE "master information block" for instance).

In practice, a mobile station may then scan for and evaluate the strength of any detected pilot signals, possibly preferring signals from a particular cellular wireless system for instance, and the mobile station may then seek to operate in the coverage area broadcasting the strongest pilot signal. For instance, the mobile station may transmit on a reverse link control channel in that coverage area a registration request or attach request, and the serving base station and associated equipment may process the registration and transmit on a forward link control channel a registration acknowledgement message. Further, once initially registered in a coverage area, a mobile station may continue to monitor the pilot signal of that coverage area as well as the pilot signals of adjacent coverage areas, to help ensure that the mobile station continues to operate in the coverage area providing the strongest coverage.

In particular, when a mobile station is first powered on, or after any call or data session in which it is engaged ends, it enters an initialization state in which it attempts to "acquire" a wireless communication system. As part of the system acquisition process, the mobile station sequentially tunes to one or more RF frequencies in order to detect and identify a wireless communication system. In order to determine which frequencies to check, and which of any identified systems the mobile station is allowed to acquire, the mobile station consults a "Preferred Roaming List" (PRL). Stored internally on the mobile station (e.g., in memory) and updated from time to time by the mobile station's home network, the PRL contains a list of bands, frequencies and associated systems, as well as a prioritized search order.

In typical operation, the mobile station will sequentially tune to each frequency according the priority order set in the PRL until it acquires a system. At each frequency, the mobile station searches for the strongest pilot signal, and then decodes the sync channel associated with the pilot in order to identify the system and the network to which the pilot belongs. The mobile station then consults the PRL to determine if the mobile station is allowed to acquire the system. If the system is not an allowed system, the mobile station continues to search other frequencies. If allowed, the mobile station then decodes the associated paging channel to obtain additional information that enables the mobile station to communicate with the system. At this point, the mobile station has acquired a system, and it discontinues searching. With the system thus acquired, the mobile station enters an "idle" state, in which it may then proceed to engage in wireless communications, such as receiving or originating a call, or originating a data session, for example.

To initiate a call (e.g., voice call, data session, or other type of call) when operating in a coverage area, a mobile station may transmit on a reverse link access channel of the coverage area an origination request or the like, requesting the serving base station to allocate resources for the call. The base station may then reserve resources for the call and transmit on a forward link control channel a directive for the mobile station to proceed with the communication using particular air interface resources (such as a particular air interface traffic channel, timeslots, or resource blocks). Likewise, if the base station or associated equipment receives a request to connect a call to the mobile station, the base station may transmit on a forward link control channel a page message for the mobile station, and the mobile station may receive and respond to that page message to facilitate setup of the call.

During an ongoing call in a coverage area, the mobile station may also continue to monitor the pilot signal of that coverage area and the pilot signals of adjacent coverage areas. For instance, the mobile station may regularly measure signal strength from its serving coverage area and from adjacent coverage areas and may regularly report the signal strength level(s) in radio measurement reports to its serving base station. If appropriate, the base station or associated equipment may then arrange for handoff of the mobile station to another coverage area. For instance, if the mobile station reports a sufficiently stronger signal from an adjacent coverage area, the base station or associated equipment may arrange for transfer of the call to the adjacent coverage area and may send a handoff direction message to the mobile station, instructing the mobile station to continue the call in the adjacent coverage area.

B. Overview of an Example Positioning System

A typical positioning system will determine the location of a mobile station through a triangulation, trilateration, or multilateration process. For example, a trilateration or multilateration process considers base station signal delay measurements taken and reported by the mobile station. In particular, using known techniques (based on evaluation of signal phase or the like), the mobile station can measure the time that it takes for signals to travel respectively over the air from each of multiple cellular base stations to the mobile station, and the mobile station will report those base station delay measurements to the positioning system. Using those delays, along with the known speed of the signals, the positioning system may then compute the distance between the mobile station and each base station. In turn, for each base station, the positioning system may programmatically define an arc centered around a known fixed position of the base station and having a radius extending the distance from that position to the mobile station. The positioning system may then estimate the mobile station's location as the intersection of those arcs.

Normally, when a PDE seeks to determine the location of a mobile station, the mobile station provides to the PDE an identification of the mobile station's currently serving base station (e.g., the base station identifier (BSID) and system identity number (SID)/network identity number (NID)), and the PDE then queries a base station almanac (BSA) to ensure that base station is listed and to find the location of that base station. If the base station is listed, the PDE then requests the mobile station to provide a delay measurement for that base station and to report neighboring base stations and corresponding delay measurements, so that the PDE can compute the mobile station's location through, for example, multilateration.

In response, the mobile station can then report to the PDE a number of neighboring base stations and corresponding delay measurements, identifying each neighboring base station with generalized information such as PN offset and frequency. The mobile station may only have, however, limited information from surrounding base stations (although the serving cell tower's information should be complete).

By using the serving base station's identification information and by searching for base stations having each indicated PN offset and frequency that neighbor the serving base station, the PDE can look up the neighboring base stations in the BSA to determine their identities and locations. Given the locations and delay measurements of the serving base station and neighboring base stations, the PDE can then determine the mobile station's location through trilateration or multilateration.

The foregoing location determination process assumes as a basic matter that a carrier maintains a BSA that correlates the wireless carrier's BSID with the geographic location information. For instance, the BSA data may correlate the BSID with known geographic coordinates of the base station. The BSA may, as well, correlate those known geographic coordinates with information such as satellite assistance data for satellites in the sky over that geographic location.

Generally, a wireless carrier implements many base stations throughout its network, to provide served mobile stations with widespread cellular coverage. Such base stations are at fixed, known geographic locations (latitude/longitude coordinates). In practice, the wireless carrier would thus structure its BSA to identify each base station by its BSID and its known geographic location (e.g., latitude/longitude coordinates).

A problem with mobile station location determination may arise if a wireless carrier's BSA does not include the serving base station or does not include accurate or available location information for the serving base station. For example, information on base stations often changes due to maintenance, changing radio frequency plans, or sometimes never gets entered in the case of a new base station. If these changes are not reflected in the PDE record (BSA) or information is not available, then the PDE is unable to provide a location and the location determination attempt fails.

Currently, the problem can only be resolved once the issue is identified and the PDE record is updated to include the new information. Consequently, when it becomes necessary to determine the location of a mobile station that is served by a base station, although the positioning system may receive the BSID of the base station, that positioning system may be unable to obtain geographic location data based on that BSID if the BSA does not have a record (or a complete record) for the BSID. An improvement is therefore desired.

Disclosed herein is a method and corresponding apparatus providing such an improvement. As presently contemplated, when a position determining entity (PDE) of a positioning system receives a request to determine the location of a mobile station, the PDE may determine from the request that the mobile station is currently served by a base station whose geographic location is not available from the base station almanac. In response, the PDE may then send a message to the mobile station to connect or partially connect with another base station to facilitate location determination.

In doing so, the mobile station can obtain identifying information for the other base station (e.g., BSID and SID/NID), and the mobile station can send that identifying information to the PDE. The PDE can then query the BSA to determine whether that base station is listed and to find the location of that base station. If the base station is listed, the PDE can proceed with computing the mobile station's location. If the base station is not listed, the PDE may send another message to the mobile station to connect or partially connect with yet another base station to facilitate location determination. The process may continue as long as necessary.

In one embodiment, the PDE will direct the mobile station to drop its serving base station and connect with another base station, such as a base station with a weaker signal strength than the original serving base station. In some embodiments, the newly connected base station is an available base station with the next-strongest signal strength compared to the original serving base station.

In some embodiments, the PDE may direct the mobile station to go through a partial acquisition process with another base station. In a partial acquisition process, the mobile station may begin acquiring connectivity to another base station. The acquisition process may only proceed as far as needed for the mobile station to obtain sufficient identifying information (e.g., SID, NID, BSID, etc.) of the other base station, without the need for the mobile station to drop its serving base station.

An example implementation of the disclosed embodiments can utilize the PDE's direct communication with a mobile station. In many cases, a mobile station already includes an algorithm that directs the mobile station to tune to one base station or another, usually the base station broadcasting the strongest pilot signal. To implement the disclosed embodiments, the PDE would send a "tower not in BSA failure" message to the mobile station requesting acquisition or partial acquisition of a signal from another base station. In some embodiments, the mobile station would also include signaling to the algorithm to ignore the stronger serving signal and acquire or partially acquire (via, for example, well-known handoff procedures), a signal from another base station (in some cases, the next strongest signal).

In any case, while the serving cell tower or base station may not provide the needed information other towers or base stations in the area may. While these secondary towers may not provide the best signal levels to hold up a voice call, the PDE uses data "calls" that can operate with much lower signal strengths. Accordingly, when the PDE receives information from a mobile station that cannot be used to obtain location information for the mobile station's serving base station, the PDE could signal back to the mobile station to acquire or partially acquire another signal (such as the next strongest signal) as the serving base station. With the new base station identification information, the PDE now has a second chance to obtain the needed data to calculate position. If this were to fail, the process could be repeated until no signal could be found.

For example, a user of a mobile station, such as a cell phone, may be connected to a base station, such as a cell tower, that has recently been put into service. The wireless carrier may not, however, have recorded the base station in the tower database (i.e., the BSA). If the user attempts to invoke, for example, a mapping program with his or her phone, the phone may connect to the PDE, but the PDE will not be able to locate the phone because the new tower information is not available.

Normally, the inability to locate the phone would cause a failure and the phone would not be able to use the PDE to obtain a location. But with the embodiments disclosed herein, the PDE can signal the phone to acquire or partially acquire a connection to another cell tower, such as the cell tower broadcasting on the next strongest signal. In doing so, the phone can obtain base station identification information for the other tower, which the phone can transmit to the PDE.

In the disclosed embodiments, the PDE has another opportunity to locate the phone by using the newly acquired identification information for the other tower. If the BSA includes the other tower's location information, the user's location attempt can now successfully proceed. Alternatively, if the BSA does not include the other tower's location information, the process can be repeated until all available tower options have been exhausted. After the location process is complete, the mobile station may then return to the optimum tower for signal strength.

C. An Example Method of Requesting and Receiving a Location Based Service

Referring to the drawings, FIG. 1 is a simplified block diagram of a prior art arrangement and signaling for requesting and receiving a location based service. The figure generally depicts a mobile station 12, a location based service provider (LBSP) (e.g., one or more computer servers functioning as the LBSP) 14, and a positioning system 16.

As a general matter, with this arrangement, mobile station 12 may transmit to LBSP 14 a request for a location based service, as shown at step A. The request for the location based service may be conveyed by a browser function of mobile station 12 as a hypertext transfer protocol (HTTP) request as shown, or may be conveyed in any other manner desired (e.g., using any other signaling or messaging protocol and through any other function of the mobile station). At step B, upon receipt of the location based service request, the LBSP may then send to positioning system 16 a request for the location of the mobile station, keyed to an identifier or address of the mobile station as provided or established by the request from the mobile station.

The process of determining a mobile station's location may at a minimum involve considering cellular base station signal delay measurements. Consequently, once the positioning system receives a request for a mobile station's location, the positioning system may generally send a request to the mobile station seeking those delay measurements and may then receive the delay measurements in response from the mobile station. Several mechanisms are well defined to facilitate that request/response communication between the positioning system and the mobile station.

According to one mechanism, known as "control plane" signaling, the positioning system will query a home location register (HLR) to determine the switch that is currently serving the mobile station. The positioning system will then engage in control signaling communication with the switch, possibly according to the well known industry standard 3GPP2 X.P0002/TIA PN-4747 (IS-881) or another standard, to provide a request message (e.g., an IS-881 "SMDPP" message) seeking the desired base station delay measurements from the mobile station. Upon receipt of the request from the positioning system, the switch may then engage in control signaling over the air interface with the mobile station, possibly according to the well known IS-801 standard, to send a position determination (PD) request message seeking the requested base station delay information from the mobile station. The mobile station may then respond by transmitting the base station delay information in an IS-801 PD response message to the switch, and the switch may then send that base station delay information in an smdpp response message to the positioning system.

According to another mechanism, known as "user plane" signaling, the positioning system and mobile station may engage in a higher layer direct communication with each other, through use of Short Messaging Service (SMS) signaling (e.g., via an SMS controller) and/or through IP communication (via a packet-switched network), so that the positioning system can request the data more directly and the mobile station can send the requested data more directly to the positioning system. For instance, the positioning system may send to the mobile station a specially coded SMS message that will trigger the mobile station to respond directly to the positioning system with a mobile originated SMS message that provides the positioning system with certain data, such as base station delay measurements.

Accordingly, at step C, in response to the request for location of the mobile station, the positioning system 16 may then generate and send to the mobile station 12 (e.g., through control plane signaling or user plane signaling) a request for base station delay measurements. At step D, the mobile station 12 may then send to the positioning system 16 a response message providing the requested base station delay measurements (e.g., the raw measurements or derivatives of those measurements). At step E, after using those base station delay measurements as a factor to determine the mobile station's location, the positioning system 16 then sends the determined position to the LBSP 14. And at step F, after using the determined position as a basis to ascertain or establish a service (e.g., information) for the mobile station, the LBSP sends a response message to the mobile station providing the location-based service.

D. An Example Network Arrangement

Figure 2:
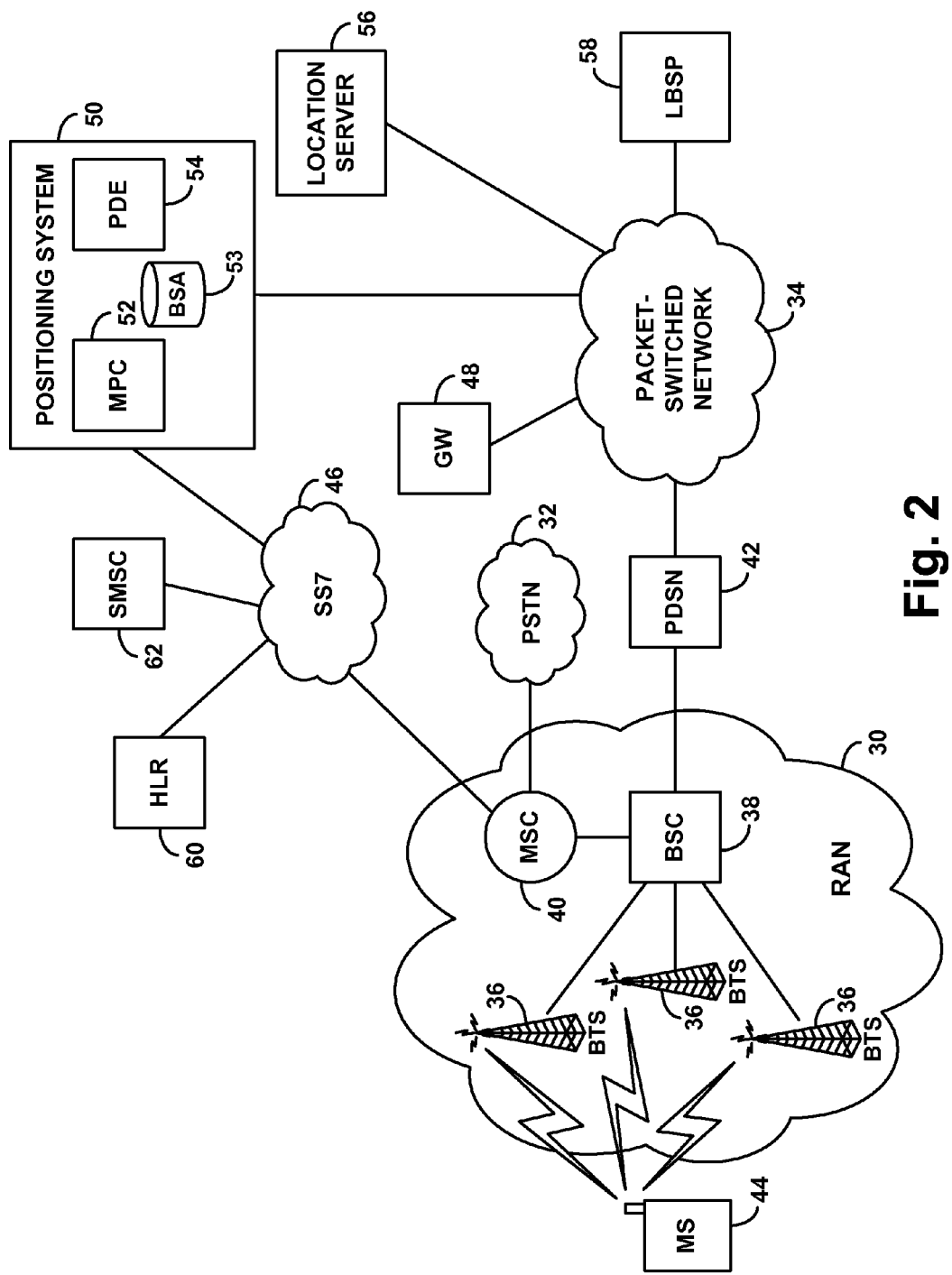
FIG. 2 is a simplified block diagram showing in more detail an example communication system in which an example embodiment can be implemented.

FIG. 2 depicts in greater detail a network arrangement in which embodiments can be implemented. The arrangement of FIG. 2 includes a radio access network (RAN) 30, which functions generally to provide mobile stations with access to one or more transport networks, such as the public switched telephone network (PSTN) 32 and a public or private packet-switched network 34, such as the Internet, for example.

RAN 30 is shown including three representative base transceiver stations (BTSs or "base stations") 36. Each BTS radiates to define a cell and one or more cell sectors. Each BTS also transmits one or more pilot signals (e.g., one per sector) usable by mobile stations to measure signal strength and BTS to mobile station signal delay in a known manner or in some other manner to be developed later.

The representative BTSs are shown coupled with a base station controller (BSC) 38, which is in turn coupled with a mobile switching center (MSC) 40, which provides connectivity with the PSTN 32. Further, the BSC 38 is coupled with a packet data serving node (PDSN) 42, which provides connectivity with a packet-switched network 34. With this arrangement, a representative mobile station 44 can thus communicate through RAN 30 with entities on the PSTN 32 and/or the packet-switched network 34. Those skilled in the art appreciate that other RAN configurations, using other elements or elements with different names, ranging in degree of complexity, are possible as well.

With the example RAN configuration shown and in an example process, calls may be placed over PSTN as follows. To place a call over PSTN 32, mobile station 44 may transmit a call origination message over an air interface access channel to RAN 30, providing dialed digits. Upon receipt of the call origination message, MSC 40 may then direct BSC 38 to assign an air interface traffic channel for use by the mobile station 44 to engage in the call. MSC 40 may also set up the call over PSTN 32 to the called number. In particular, MSC 40 may engage in ISDN User Part (ISUP) signaling over a signaling network 46, such as a Signaling System #7 (SS7) network, with a switch serving the called party. Similarly, when MSC 40 receives a request to connect a call to mobile station 44, MSC 40 may page the mobile station 44 over an air interface paging channel and may direct BSC 38 to assign an air interface traffic channel for the call.

To engage in packet-data communication on packet-switched network 34, the mobile station 44 would typically need to acquire a radio layer link, a data layer link, and an IP address, to the extent it does not have these already. To do so, for example, the mobile station 44 may transmit a packet-data origination request message over an air interface access channel to RAN 30. Upon receipt of that message, MSC 40 may then forward the message back to BSC 38. BSC 38 may then assign an air interface traffic channel for use by the mobile station as a radio link. Further, BSC 38 may signal to PDSN 42, and PDSN 42 may negotiate with mobile station 44 to establish a point-to-point protocol (PPP) data link. Still further, PDSN 42 or a mobile-IP home agent (not shown) may assign an IP address for use by mobile station 44 to communicate on network 34.

FIG. 2 also shows a gateway 48 sitting as a node on the packet-switched network 34. Gateway 48 may function as a proxy for communications between devices served by RAN 30 and other entities on network 34. Thus, when mobile station 44 engages in packet-switched communication with an entity on network 34, the communications may pass through gateway 48, and gateway 48 may operate on the communications as an intermediary, carrying out one or more beneficial functions. Mobile station 44 may be programmed to route all communications initially to gateway 48 for transmission in turn to destination entities. Alternatively, PDSN 42 may be programmed to pass all communications to gateway 48 for transmission in turn to their destinations. Still alternatively, gateway 48 could be positioned between PDSN 42 and network 34, so that all such communications must pass through gateway 48 on the way to their destinations. Other arrangements are possible as well.

FIG. 2 also depicts an example positioning system 50, which may be operated by the wireless service provider that operates RAN 30 and may be arranged to determine and report mobile station locations to requesting entities as discussed above. As shown, the positioning system 48 may include a mobile positioning center (MPC) 52 and a position determining entity (PDE) 54, which may be integrated together. In addition, the positioning system is shown including a base station almanac (BSA) 53, although BSA 53 could just as well be located external to the positioning system and made accessible to the positioning system to the extent necessary to facilitate determining of mobile station location.

The positioning system 50, as well as its components such as MPC 52 and PDE 54, may each be implemented as computer servers, each having network interfaces for communication with each other and with other entities, one or more processors, non-transitory data storage, and program instructions stored in the data storage and executable by the processor(s) to carry out various functions described herein. Further, the figure depicts a location server 56, which the wireless service provider may operate as a front end for receiving location requests from LBSP applications and forwarding those requests to the positioning system 50.

With this arrangement, when the location server 56 receives a location request from the LBSP 58, the location server may send a corresponding location request to the MPC 52 (e.g., via network 34), and the MPC 52/PDE 54 may, in turn, determine the location of the mobile station 44. The MPC may then return the determined location of the mobile station to the location server, and the location server may then return to the LBSP the determined location (or a derivation of that data, such as, perhaps, information selected or established based on the location).

As noted above, when an LBSP receives a location based service request from a mobile station and queries a positioning system (in this case location server 56) to determine the mobile station's location, the positioning system may in turn need to obtain base station delay measurements from the mobile station to facilitate computing the mobile station's location through a process such as trilateration or multilateration. In FIG. 2, if the positioning system 50 engages in control plane signaling with the mobile station, the positioning system 50 may first query a home location register (HLR) 60 to determine the MSC serving the mobile station, and the positioning system may then engage in signaling via that MSC to communicate with the mobile station and thereby request and receive base station delay measurements. Alternatively, the positioning system 50 may engage in user plane signaling, such as SMS signaling through a short messaging service center (SMSC) 62 to request and receive the base station delay measurements from the mobile station.

In any case, to determine the location of the mobile station 44 in response to a location based service request, the positioning system 50 may need to query the BSA 53 to determine the location of the base station (BTS) 36 with which the mobile station is registered. With the benefit of the present embodiments as described herein, if the positioning system 50 cannot obtain from BSA 53 the location of the BTS 36 with which mobile station 44 is registered (for example, if BSA 53 does not include the location of the registered BTS 36 or does not include any information regarding BTS 36), the positioning system 50 can transmit a message to the mobile station 44 directing mobile station 44 to obtain an identification of a second BTS 36. In some embodiments, the second BTS 36 is a BTS with which mobile station 44 is not registered. In addition, in some embodiments, as received by mobile station 44, the pilot signal strength of the second BTS 36 may be weaker than the pilot signal strength of the first BTS 36.

In one embodiment, the positioning system 50 will direct the mobile station 44 to drop its serving BTS 36 and connect with another BTS 36. In some embodiments, the positioning system 50 may direct mobile station 44 to go through a partial acquisition process with another BTS 36. In a partial acquisition process, mobile station 44 may begin acquiring connectivity to the other BTS 36. The acquisition process may only proceed as far as needed for mobile station 44 to obtain sufficient identifying information (e.g. BSID and SID/NID) of the other BTS 36, without the need for the mobile station to drop its serving BTS. In some embodiments, the newly connected BTS is an available BTS with the next-strongest signal strength compared to the original serving BTS.

It should be understood that the method described herein is machine implemented. Namely, the method is carried out by one or more computer processors and hardware. For instance, the mobile station operates a processor and wireless communication interface, to generate and transmit to the RAN a location based service request for transmission to an LBSP, providing in the location based service request an identification of a base station usable by a positioning system to determine the mobile station's location as described above. An intermediary in the communication path between the mobile station and the LBSP may then operate a processor and network communication interface to receive the transmitted location based service request and to forward the request along to the LBSP. Further, either the LBSP or the intermediary may operate a processor and network communication interface to extract (e.g., read, decode, etc.) from the location based service request information needed to by the positioning system to facilitate determination of the mobile station's location.

In addition, the example embodiments described herein provide a physical transformation. As one example, example embodiments result in a mobile station acquiring or partially acquiring a connection to a second base station. As another example, example embodiments result in the ability to determine the geographic location of a mobile station and, in some cases, the ability to provide location based services based on that location. Without the benefit of the disclosed embodiments, the traditional method as described above would result in the inability to determine the geographic location of the mobile station and, in some cases, the inability to provide location based services based on that location. Advantageously, with the benefit of the present embodiments, geographic locations of mobile stations can be provided in a wider range of cases, and, consequently location based services can also be provided to a wider range of mobile station users.

E. Example Network Components

Figure 3:
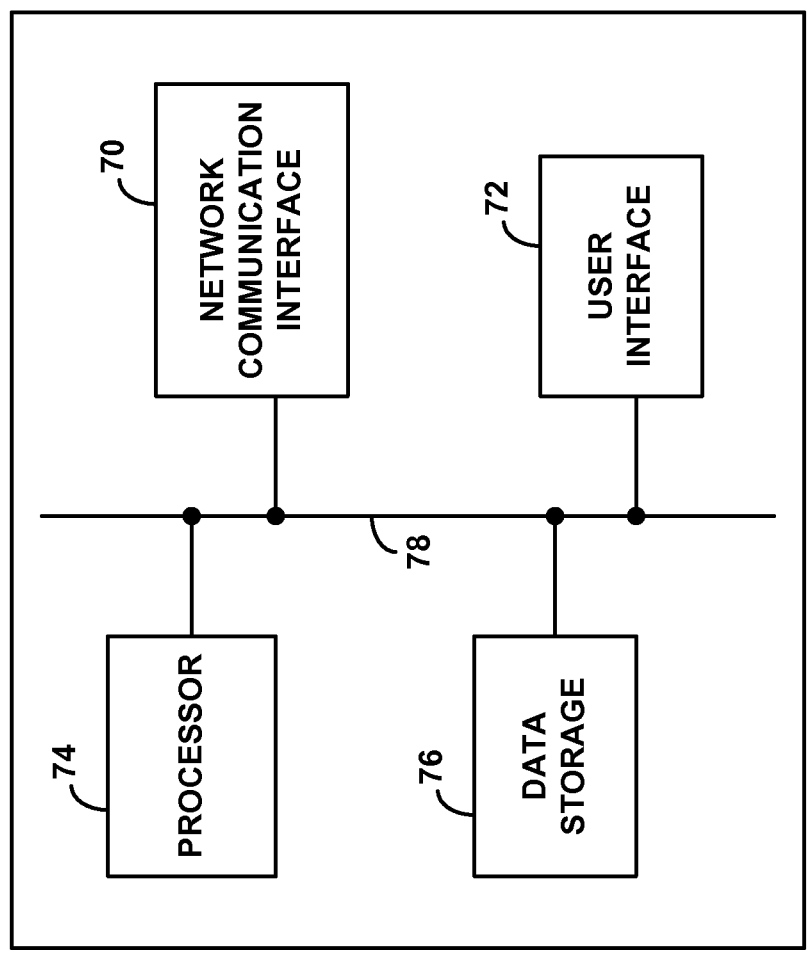
FIG. 3 is a simplified block diagram depicting components of example entities arranged to carry out various functions of an example embodiment.

FIG. 3 is a block diagram depicting components that may be included in each of the various entities described above, to facilitate implementation of the functions described above. As shown in FIG. 3, the components include a network communication interface 70, a user interface 72, a processor 74, and data storage 76, all of which may be coupled together or otherwise integrated by a system bus or other connection mechanism 78.

Network communication interface 70 may comprise a wireless and/or wireline communication interface. For instance, the network communication interface of mobile station 44 preferably comprises a wireless communication module arranged to engage in air interface communication with RAN 30, using one of the air interface protocols noted above or another now know or later developed. The mobile station 44 would preferably also operate the network communication interface to receive pilot signals or other signals from base stations in its vicinity and to measure or facilitate measurement of BTS to mobile station delays of those signals for use as discussed above. The network communication interface in other elements may comprise Ethernet network interface modules or the like, or may take any of a variety of other forms.

User interface 72 may include input and output components for interaction with a user. In mobile station 44, for instance, the user interface may include a display, keypad, microphone, speaker, and other components, to enable a user to direct the mobile station to provide a location based service request. For instance, a user of the mobile station may engage in a wireless web session, browse to an LBSP site, and invoke a link to request a location based service. In response, a browser function on the mobile station may generate and send a location based service request to the LBSP, with program logic in the mobile station functioning to include or add into that request the mobile station's base station identification information. Other elements shown may include similar or different types of user interfaces, if any at all.

Processor 74 may include one or more general purpose processors (e.g., microprocessors) and/or one or more special purpose processors (e.g., application specific integrated circuits). Data storage 76 may then include one or more volatile or non-volatile storage components, such as magnetic, optical, or organic storage components, and may be integrated in whole or in part with processor 74. Data storage may include program instructions (e.g., machine language instructions) executable or interpretable by processor 74 to carry out the various functions described above.

Example embodiments have been described above. Those of ordinary skill in the art will appreciate that variations from the embodiments described are possible, and that numerous changes may therefore be made while remaining within the true scope and spirit of the invention as described by the claims.

F. Example Methods of Operation

Figure 4:
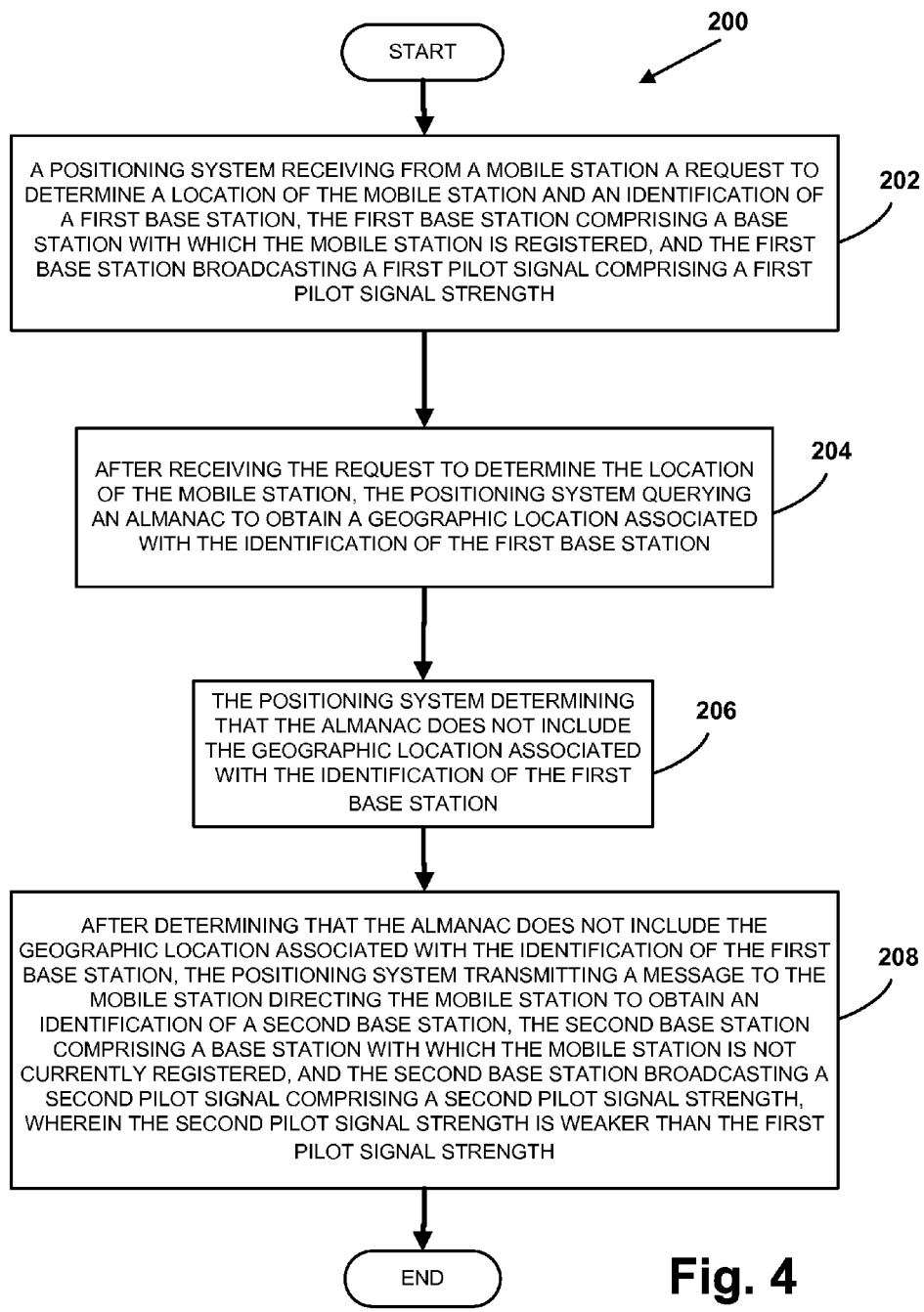
FIG. 4 is a flow chart illustrating a method, according to an example embodiment.

FIG. 4 is a flow chart illustrating a method 200, according to an example embodiment. As shown in FIG. 4, method 200 begins at block 202. At block 202, a network entity, such as a positioning system, can receive from a mobile station a request to determine a location of the mobile station and an identification of a first base station. In some embodiments, the request to determine a location of the mobile station can comprise a location based service request.

The identification of the first base station can include, for example, the BSID and SID/NID. In addition, the first base station can comprise a base station with which the mobile station is registered. The first base station can also be broadcasting a first pilot signal comprising a first pilot signal strength.

At block 204, after receiving the request to determine the location of the mobile station, a network entity, such as the positioning system, can query an almanac (such as the BSA) to obtain a geographic location associated with the identification of the first base station. In some embodiments, the geographic location can comprise, for example, geographic coordinates, such as latitude and longitude and/or GPS coordinates.

At block 206, a network entity, such as the positioning system, can determine that the almanac does not include the geographic location associated with the identification of the first base station. In some embodiments, the almanac may not have any information regarding the first base station—in other words, the first base station may not be included in the almanac. In some cases, the first base station may have been recently added to the network and the almanac may not have been updated to reflect the addition of the first base station. In other embodiments, the almanac may have information regarding the first base station, but the information may not be complete and may not include geographic location information or accurate geographic location information.

At block 208, after determining that the almanac does not include the geographic location associated with the identification of the first base station, a network entity, such as the positioning system, can transmit a message to the mobile station directing the mobile station to obtain an identification of a second base station. The second base station can comprise a base station with which the mobile station is not currently registered. In addition, the second base station can be broadcasting a second pilot signal that can comprise a second pilot signal strength. In some embodiments, the second pilot signal strength is weaker than the first pilot signal strength. Further, in some embodiments, the second pilot signal can be the next strongest pilot signal (after the first pilot signal) received by the mobile station.

FIG. 5 is a flow chart illustrating a method 300, according to an example embodiment. As shown in FIG. 5, method 300 begins at block 302. At block 302, a mobile station can receive from a first base station a first pilot signal, and the first pilot signal can comprise a first pilot signal strength. The first base station can comprise a base station with which the mobile station is registered.

At block 304, the mobile station can transmit a location based service request and an identification of the first base station. In some embodiments, the mobile station transmits the location based service request to a LBSP. In some embodiments, the mobile station transmits the location based service request to a positioning system. In some embodiments, the mobile station transmits the location based service request to one more intermediate entities before transmitting the request to either the LBSP or positioning system. Other examples are possible as well.

At block 306, the mobile station can receive from a second base station a second pilot signal, and the second pilot signal can comprise a second pilot signal strength. In some embodiments, the second pilot signal strength is weaker than the first pilot signal strength. The second base station can also comprise a base station with which the mobile station is not currently registered. In addition, in some embodiments, the mobile station can receive the second pilot signal before the mobile station transmits a location based service request and an identification of the first base station.

At block 308, after transmitting the location based service request and an identification of the first base station, the mobile station can receive a message directing the mobile station to obtain an identification of a base station with which the mobile station is not currently registered. The message can further direct that the base station with which the mobile station is not currently registered be transmitting a pilot signal that comprises a pilot signal strength that is weaker than the first pilot signal strength. In some embodiments, the second pilot signal can be the next strongest pilot signal (after the first pilot signal) received by the mobile station.

At block 310, after receiving the message identified in block 308, the mobile station can obtain the identification of the second base station from the second base station. In some cases, the first base station can provide some information regarding the second base station, such as the PN offset and frequency. Such information provided by the first base station, however, is not complete. For example, the first base station may not have the information needed to look up the second base station in the BSA, such as the SID, NID, or BSID of the second base station. Accordingly, the mobile station obtains such information from the second base station.

At block 312, after obtaining the identification of the second base station from the second base station, the mobile station can transmit the identification of the second base station. In some embodiments, the mobile station transmits the identification of the second base station to the LBSP. In some embodiments the mobile station transmits the identification of the second base station to the positioning system. In some embodiments, the mobile station transmits the identification of the second base station to one more intermediate entities before transmitting the request to either the LBSP or positioning system. Other examples are possible as well.

At block 314, after transmitting the identification of the second base station, the mobile station receives a location based service in response to the location based service request. In some embodiments, a LBSP can receive the location of the mobile station from the positioning system, and the LBSP can use the location of the mobile station as a basis to provide a location based service in response to the location based service request.

In addition, in some embodiments, a positioning system can receive the identification of the first base station, either directly from the mobile station, from a LBSP, or via one or more intermediary entities. The positioning system can, in turn, query an almanac (such as the BSA) to obtain a geographic location associated with the identification of the first base station. The positioning system may also determine that the almanac does not include the geographic location associated with the identification of the first base station. The positioning system may then receive the identification of the second base station. The positioning system may then query the almanac to obtain a geographic location associated with the identification of the second base station. The positioning system may then determine that the almanac includes the geographic location associated with the identification of the second base station. In some embodiments, the positioning system then uses the geographic location associated with the identification of the second base station to determine a location of the mobile station.

In some embodiments, the positioning system will direct the mobile station to drop the first base station and connect with the second base station. In some embodiments, the positioning system may direct the mobile station to go through a partial acquisition process with another base station. In a partial acquisition process, the mobile station may begin acquiring connectivity to another base station. The acquisition process may only proceed as far as needed for the mobile station to obtain sufficient identifying information (e.g. BSID and SID/NID) of the other base station, without the need for the mobile station to drop its serving base station. In some embodiments, the newly connected base station is an available base station with the next-strongest signal strength compared to the original serving base station.

G. Conclusion

It should be understood the arrangements and functions described herein are presented for purposes of example only, and that numerous variations are possible. For instance, elements can be added, omitted, combined, distributed, reordered, or otherwise modified. Further, where this document mentions functions that can be carried out by a device or other entity, it should be understood that the functions may be implemented by software (e.g., machine language instructions stored in data storage and executable by a processor), firmware, and/or hardware.

We claim:

1. A method comprising:
a positioning system receiving from a mobile station a request to determine a location of the mobile station and an identification of a first base station, the first base station comprising a base station with which the mobile station is registered, and the first base station broadcasting a first pilot signal comprising a first pilot signal strength;

after receiving the request to determine the location of the mobile station, the positioning system querying an almanac to obtain a geographic location associated with the identification of the first base station;

the positioning system determining that the almanac does not include the geographic location associated with the identification of the first base station; and after determining that the almanac does not include the geographic location associated with the identification of the first base station, the positioning system transmitting a message to the mobile station directing the mobile station to obtain an identification of a second base station, the second base station comprising a base station with which the mobile station is not currently registered, and the second base station broadcasting a second pilot signal comprising a second pilot signal strength, wherein the second pilot signal strength is weaker than the first pilot signal strength.

2. The method of claim 1, further comprising:
the positioning system receiving the identification of the second base station; and
the positioning system querying the almanac to obtain a geographic location associated with the identification of the second base station, and determining that the almanac includes the geographic location associated with the identification of the second base station.

3. The method of claim 2, further comprising:
the positioning system using the geographic location associated with the identification of the second base station to determine the location of the mobile station; and
the positioning system providing the location of the mobile station to a location based service provider (LBSP).

4. The method of claim 3, further comprising:
the LBSP using the location of the mobile station as a basis to provide a location based service in response to a location based service request.

5. The method of claim 4,
wherein the location based service request comprises the request to determine the location of the mobile station.

6. The method of claim 3,
wherein the positioning system receiving from the mobile station the request to determine the location of the mobile station and the identification of the first base station comprises the positioning system receiving request to determine the location of the mobile station and the identification of the first base station from the LBSP in a communication path between the mobile station and the positioning system.

7. The method of claim 1,
wherein a plurality of pilot signals are available to the mobile station, the plurality of pilot signals including the first pilot signal and the second pilot signal;
wherein the plurality of pilot signals comprises a plurality of pilot signal strengths, including the first pilot signal strength and the second pilot signal strength; and
wherein none of the plurality of pilot signal strengths is both stronger than the second pilot signal strength and weaker than the first pilot signal strength.

8. The method of claim 1,
wherein transmitting the message to the mobile station directing the mobile station to obtain the identification of the second base station comprises directing the mobile station to drop its connection to the first base station and acquire a connection to the second base station.

9. The method of claim 1,
wherein transmitting the message to the mobile station directing the mobile station to obtain the identification of the second base station comprises directing the mobile station to partially acquire a connection to the second base station; and
wherein the mobile station maintains its connection with the first base station.

10. The method of claim 1,
wherein determining that the almanac does not include the geographic location associated with the identification of the first base station comprises determining that the almanac does not include the identification of the first base station.

11. The method of claim 1,
wherein the geographic location comprises geographic coordinates.

12. A method comprising:
a mobile station receiving from a first base station a first pilot signal comprising a first pilot signal strength, the first base station comprising a base station with which the mobile station is registered;
the mobile station transmitting a location based service request and an identification of the first base station;
the mobile station receiving from a second base station a second pilot signal comprising a second pilot signal strength, the second pilot signal strength being weaker than the first pilot signal strength and the second base station comprising a base station with which the mobile station is not currently registered;
after transmitting the location based service request and an identification of the first base station, the mobile station receiving a message directing the mobile station to obtain an identification of a base station with which the mobile station is not currently registered, wherein the base station with which the mobile station is not currently registered is transmitting a pilot signal comprising a pilot signal strength that is weaker than the first pilot signal strength;
after receiving the message directing the mobile station to obtain an identification of a base station with which the mobile station is not currently registered, wherein the base station with which the mobile station is not currently registered is transmitting a pilot signal comprising a pilot signal strength that is weaker than the first pilot signal strength, the mobile station obtaining the identification of the second base station from the second base station;
after obtaining the identification of the second base station from the second base station, the mobile station transmitting the identification of the second base station; and
after transmitting the identification of the second base station, the mobile station receiving a location based service in response to the location based service request.

13. The method of claim 12, further comprising:
a positioning system receiving the identification of the first base station;
the positioning system querying an almanac to obtain a geographic location associated with the identification of the first base station, and determining that the almanac does not include the geographic location associated with the identification of the first base station;
the positioning system receiving the identification of the second base station;
the positioning system querying an almanac to obtain a geographic location associated with the identification of the second base station, and determining that the almanac includes the geographic location associated with the identification of the second base station; and
the positioning system using the geographic location associated with the identification of the second base station to determine a location of the mobile station.

14. The method of claim 13, further comprising:
a location based service provider (LBSP) receiving the location of the mobile station from the positioning system; and the LBSP using the location of the mobile station as a basis to provide a location based service in response to the location based service request.

15. The method of claim 14,
wherein receiving the identification of the first base station comprises receiving the identification of the first base station from the LBSP;
wherein receiving the identification of the second base station comprises receiving the identification of the second base station from the LBSP; and
wherein the LBSP comprises a communication path between the mobile station and the positioning system.

16. The method of claim 12,
wherein the mobile station obtaining the identification of the second base station from the second base station comprises the mobile station dropping its connection to the first base station and acquiring a connection to the second base station.

17. The method of claim 12,
wherein the mobile station obtaining the identification of the second base station from the second base station comprises the mobile station partially acquiring a connection to the second base station, and the mobile station maintaining its connection with the first base station.

18. A non-transitory machine readable medium having stored thereon instructions executable by a processing unit to carry out functions comprising:
receiving from a mobile station a request to determine a location of the mobile station and an identification of a first base station, the first base station comprising a base station with which the mobile station is registered, and the first base station broadcasting a first pilot signal comprising a first pilot signal strength;
after receiving the request to determine a location of the mobile station, querying an almanac to obtain a geographic location associated with the identification of the first base station, and determining that the almanac does not include the geographic location associated with the identification of the first base station;
after determining that the almanac does not include the geographic location associated with the identification of the first base station, transmitting a message to the mobile station directing the mobile station to obtain an identification of a second base station, the second base station comprising a base station with which the mobile station is not currently registered, and the second base station broadcasting a second pilot signal comprising a second pilot signal strength, wherein the second pilot signal strength is weaker than the first pilot signal strength;
after transmitting the message to the mobile station directing the mobile station to obtain the identification of the second base station, receiving the identification of the second base station;
after receiving the identification of the second base station, querying the almanac to obtain a geographic location associated with the identification of the second base station, and determining that the almanac includes the geographic location associated with the identification of the second base station; and
using the geographic location associated with the identification of the second base station to determine the location of the mobile station.

19. The non-transitory machine readable medium of claim 18,
wherein transmitting the message to the mobile station directing the mobile station to obtain the identification of the second base station comprises directing the mobile station to drop its connection to the first base station and acquire a connection to the second base station.

20. The non-transitory machine readable medium of claim 18,
wherein transmitting the message to the mobile station directing the mobile station to obtain the identification of the second base station comprises directing the mobile station to partially acquire a connection to the second base station; and
wherein the mobile station maintains its connection with the first base station.

* * * * *